United States Patent Office

2,875,179
Patented Feb. 24, 1959

2,875,179

CONVERSION OF THERMOPLASTIC RESINS TO THERMOSET RESINS

James H. Freeman, Greensburg, Pa., assignor to Westinghouse Electric Corporation, East Pittsburgh, Pa., a corporation of Pennsylvania No Drawing. Application December 6, 1954
Serial No. 473,477

1 Claim. (Cl. 260—59)

The present invention relates to molded resinous members, and has particular reference to a method for converting thermoplastic resins of the type including phenolaldehyde resins to cured, thermoset bodies.

When an aldehyde and a phenol, in a ratio of less than 1:1, respectively, are condensed in the presence of a dilute mineral acid catalyst resins form having methylene bridged chains of phenolic nuclei containing few, if any, branches or cross-linked members. Such resins are thermoplastic in nature. They are convertible to thermoset resins upon the addition of a material which supplies additional methylene groups for the formation of more linkages in the structure, such groups thereby effecting cross-linkage between molecules whereby a thermoset, cured body is formed.

Heretofore, in some instances, aldehydes have been added to the thermoplastic resins to convert the same to thermoset resins. The aldehydes used have included formaldehyde (in a water solution, namely, formalin), paraformaldehyde, furfuraldehyde, acetaldehyde, and the like often in aqueous solution. The use of aldehyde solutions is disadvantageous inasmuch as the mixing of liquid aldehydes with solid thermoplastic resins to form thermosetting materials presents manufacturing difficulties which increase the cost of producing the final product.

Since hexamethylene tetramine is a solid material which will supply methylene groups for the formation of additional linkages, it has been used widely in the past to bring about the conversion of thermoplastic phenol-aldehyde resins to a thermoset state. The thermoset resins so produced, however, are dark in color and relatively inelastic. Furthermore, free formaldehyde, ammonia and water vapor are released during the thermosetting reaction when hexamethylene tetramine is used and these by-products may be present in the finished thermoset product. The by-products are all gaseous and may cause bubbles and voids in the thermoset members.

The object of the present invention is to provide a method for treating thermoplastic phenol-aldehyde resins with a selected solid reactant comprising 2,4,6-trimethylolphenol and alkali metal and alkaline earth metal salts thereof whereby the resins are converted to a thermoset solid which is free from bubbles and voids.

A further object of the present invention is to provide a method for converting phenol-aldehyde thermoplastic resins in particulate form to thermoset molded bodies by heating such resins in the presence of 2,4,6-trimethylolphenol and its alkali metal and alkaline earth metal salts in particular form, whereby thermoset, cured resinous bodies are obtained which are light in color and semi-elastic in nature at elevated temperatures.

Other objects of the invention will, in part, be obvious and will, in part, appear hereinafter.

I have discovered that the foregoing objects are attained in a process which comprises admixing the thermoplastic resins prepared by reacting aldehyde and phenol in a ratio of less than 1:1, respectively, with at least one thermosetting additive selected from the group consisting of 2,4,6-trimethylolphenol and alkali metal and alkaline earth metal salts thereof, said additive material being employed in an amount sufficient to bring the ratio of methylene groups to phenol to above the ratio of 1:1, and heating the mixture whereby the components react and said thermoplastic resin is converted to a thermoset body.

In preparing compositons to be molded into thermoset bodies in accordance with the novel process of the present invention, the thermoplastic resins are produced initially by reacting phenol and aldehyde in selected proportions and under predetermined conditions. Generally, the aldehyde is employed in an amount such that there is about 0.6 to 0.9 mole of aldehyde present for each mole of phenol employed. The preparation of such thermoplastic phenolics is well known in the art.

The reactive additive material, more particularly, the 2,4,6-trimethylolphenol and alkali metal and alkaline earth metal salts thereof, employed in the process of this invention, may be prepared by effecting reaction between about 3 moles of formaldehyde and 1 mole of phenol in the presence of one mole of alkali at a temperature up to about 65° C. The alkaline salt of trimethylolphenol then is precipitated and recovered by diluting the reaction mixture in a suitable water miscible organic solvent and then separated therefrom by filtration, decantation or other suitable means.

Many solvents are suitable for use in effecting the precipitation and recovery just described. In general, monohydric alcohols with up to four carbon atoms are the most efficient precipitating agents, ethanol and propanol being particularly suitable. As a specific example of a method of preparing the reactive additives which may be used in converting a thermoplastic phenol-aldehyde resin to a thermoset body in accordance with the method of the present invention, the following is set forth.

*Example I*

A solution was prepared by dissolving 40 parts by weight (1.0 mole) of sodium hydroxide in 40 parts by weight of water and adding the same to 94 parts by weight (1 mole) of phenol. The solution was cooled to room temperature and 244 parts by weight (3 moles) of formalin (37% by weight formaldehyde) were added with stirring. The mixture was kept at room temperature for several days, and then poured into several times its volume of isopropanol. After fifteen minutes the resultant precipitate was filtered, washed with alcohol, and dried under vacuum.

The 2,4,6-trimethylolphenol and its alkali metal and alkaline earth metal salts is employed in an amount within the range of 3% to 20% by weight based upon the total weight of phenol-aldehyde resin employed. The preferred range is from 4% to 10% and the optimum amount for any given resin is dependent upon the nature of the particular resin being treated.

The addition of 2,4,6-trimethylolphenol, either free or in the form of one of its alkali metal or alkaline earth metal salts, to a phenol-aldehyde resin results in increased speed of conversion of the resin to a thermostat state as compared with the use of a liquid aldehyde or hexamethylene tetramine. On the basis of an equal number of methylene bridges provided, the 2,4,6-trimethylolphenol and its salts is found to be more efficient than either the liquid aldehydes or hexamethylene tetramine. The 2,4,6- trimethylolphenol and its various salts provide an association of methylol groups which function more efficiently in the thermosetting reaction than is the case with aldehydes or hexamethylene tetramine, since said methylol groups are all on one nucleus thereby insuring a tri-functional unit in the resin. As a result, cross-linking groups are established readily and the resins are converted quickly to a thermoset state.

The properties of thermoset resins prepared by use of 2,4,6-trimethylolphenol and its salts are significantly improved over those of resins prepared using liquid aldehydes or hexamethylene tetramine. The thermoset resins prepared in accordance with the process of this invention are clear amber in color, quite hard, yet become elastic when heated to 150° C. On the other hand, resins thermoset by the addition of liquid aldehydes or hexamethylene tetramine are dark in color and much less elastic when heated to 150° C.

Still another advantage attendant with the use of 2,4,6-trimethylolphenol and its salts in accordance with this invention results from the considerably smaller amount of volatile by-products formed in the reaction. For example, when hexamethylene tetramine is used as the thermosetting additive, free formaldehyde, ammonia and water vapor are released with the result that bubbles and voids frequently appear in the final product. Such gases, bubbles and voids cause the finished thermoset resin to have undesirable electrical, physical and chemical properties. When 2,4,6-trimethylolphenol and its salts are used as the thermosetting additive, only water is released during the reaction, and only one molecule of the water need be removed for each methylene cross-linking bridge formed in the thermoset product.

Molded members are prepared in accordance with this invention by grinding the thermoplastic resin into a powder and then admixing said powder with the thermosetting additive which also is in particulate form. The particulate materials so prepared preferably are admixed with suitable powdered lubricants, such as calcium stearate; fillers, such as cotton floc, asbestos fibers, silica, and wood flour; and pigments and dyes. The particulate materials then are blended thoroughly after which weighed portions are placed in a hot press and molded into members of desired shape and size at predetermined temperatures and pressures until the resin reacts and thermosets. Alternatively, the resin and thermosetting additive may be dissolved in a solvent and impregnated into sheets of a filler material such as cotton, asbestos or glass cloth or paper, the impregnated sheets then being compressed under heat and pressure to form thermoset laminated products. Plates, tubes, baffles and other insulating members readily are produced by such procedures. Meter bases, coil supports, contact supports and other apparatus may be molded from the compositions of this invention.

In order to indicate more fully the nature and capabilities of the process of the present invention, the following examples are set forth.

*Example II*

A phenol-formaldehyde resin is prepared by introducing 188 grams (2 moles) of phenol and 135 grams of formalin (1.67 moles of formaldehyde) into a reaction vessel, together with about 0.6 gram of concentrated sulfuric acid dissolved in 20 cc. of water. The mixture is refluxed at 100° C. for about two hours, after which 0.5 gram of calcium hydroxide dispersed in 5 cc. of water is introduced to neutralize the sulfuric acid catalyst. The neutralized mixture then is distilled under a pressure of 100 millimeters of mercury at a temperature of 120° C. to 130° C. until a sample of the resin is tough when removed from the reaction vessel and cooled.

*Example III*

A solution was prepared by dissolving 10 grams of the phenol-formaldehyde resin prepared in Example II in 15 cc. of acetone. To this there was added 0.7 gram of 2,4,6-trimethylolphenol dissolved in 5 cc. of acetone. The mixture was heated up to a temperature of 150° C., the acetone vaporizing off. After thirty eight minutes the mixture thermosets as a clear, yellow, hard resin. The resin was allowed to cool and then reheated to 150° C. to give a rubbery yellow mass which hardened again on cooling.

The addition of a small amount of acid such as 1% by weight of p-toluene sulfonic acid to the above formulation resulted in a decrease in thermoset time to sixteen minutes.

*Example IV*

A solution was prepared by dissolving 10 grams of the phenol-formaldehyde resin prepared in Example II in 15 cc. of acetone. To this there was added a solution of 0.8 gram of sodium trimethylolphenate dispersed in 5 cc. of acetone. This mixture was heated to 150° C., the acetone vaporizing off. In eighteen minutes the mixture thermosets as a light amber, hard, resin. The resin was allowed to cool and on reheating to 150° C. gave a rubbery yellow mass which again hardened on cooling.

*Example V*

A solution was prepared by dissolving 10 grams of the phenol-formaldehyde resin prepared in Example II in 15 cc. of acetone. To this there was added a solution of 0.25 gram of hexamethylene tetramine dissolved in 5 cc. of acetone. On heating to 150° C. the acetone vaporized off and the mixture gradually began to thermoset after fifty three minutes to give a dark brown resin which was relatively inelastic and unsuitable for use in many applications. The amounts of the additives (trimethylolphenol, sodium trimethylolphenate and hexamethylenetetramine) incorporated in Examples III, IV and V were selected in each case so as to provide an equivalent number of methylene bridges to the polymer.

The following examples illustrate the improved toughness, flexibility, and post-forming characteristics of a resin thermoset through the use of 2,4,6-trimethylolphenol or its salts in accordance with this invention, as compared with a resin thermoset by the use of hexamethylenetetramine.

*Example VI*

Strips of glass cloth ½" wide and 8" long were dipped in a mixture of a phenol-formaldehyde resin prepared as described in Example II to which had been added 10% by weight of sodium trimethylolphenate, based on the total weight of the resinous components of the composition. Gelation of the applied resinous reactants was accomplished by heating the dipped strips at a temperature of 150° C. for five minutes. Upon cooling the resin impregnated strips were found to be hard, amber clear in color and free from bubbles. The strips were reheated at a temperature of 150° C. for five minutes and wrapped, while hot, two full turns around a 10 millimeter diameter glass rod. On cooling, the wound dipped strips were free from cracks. They were returned to the oven and heated for an additional fifteen minutes. The strips were tough and flexible and were easily straightened, while hot, and rewrapped again about the rod in the reverse direction. After an additional fifteen minutes of heating, the strips still could be straightened, while hot, without cracking.

*Example VII*

Similar strips of glass cloth were dipped in a phenol-formaldehyde resin prepared in accordance with the method described in Example II, to which had been added 3.4% by weight of hexamethylenetetramine, based on the total weight of the resin. The gelation of the resin on the strips was completed by heating the same at a temperature of 150° C. for five minutes. On cooling the strips were hard and brittle, dark in color and full of bubbles. The strips were reheated at 150° C. for five minutes and wrapped two full turns around a 10 millimeter diameter glass rod. On cooling, the resin applied to the strips was cracked and quite brittle. The strips were returned to the oven and heated fifteen minutes, after which they cracked when an attempt was made to straighten them out.

Another important feature of this invention lies in the fact that 2,4,6-trimethylolphenol and its alkali and alkaline-earth metal salts is capable of converting thermoplastic resins, prepared by condensing aldehydes with difunctional phenols having two hydrogen atoms readily reactive with aldehyde, as for example, ortho- or para-cresol, to a thermoset state. This conversion reaction is of particular importance because such thermoplastic resins cannot be thermoset with aldehydes or hexamethylene tetramine. The thermosetting additives of this invention provide the necessary trireactive unit to bring about cross-linking of such thermoplastic resins thereby converting them to thermoset materials. This result was not to be expected. Resins prepared from difunctional phenols, which heretofore had no application in this field due to their permanent thermoplastic nature, now can be converted to thermoset resins which are suitable for use as molding and laminating resins.

The following examples serve to illustrate this important feature of the invention.

*Example VIII*

A resin was prepared as in Example II but using 756 parts by weight of para-cresol (7 moles) and 415 parts by weight of formalin (6 moles of formaldehyde) together with 2 parts by weight of sulfuric acid in 20 parts by weight of water. After refluxing, neutralizing, and dehydrating as in Example II a thermoplastic resin was obtained which could not be thermoset by the addition of hexamethylene tetramine.

Addition of 15% by weight of 2,4,6-trimethylolphenol (or its alkaline earth or alkali metal salts) to an acetone solution of the resin resulted in a product which thermoset in 15 minutes at 150° C. A solution of the resin which contained the thermosetting additive of this invention was used to impregnate a series of kraft paper sheets which were freed of solvent by heating at 100° C. for five minutes, then stacked in a press, and cured at a temperature of 150° C. and a pressure of 1000 p. s. i. The product was a thermoset laminated board having good bond strength.

*Example IX*

Example VIII was repeated except that an equal quantity of ortho-cresol was used in place of the para-cresol. The resin could not be cured to a thermoset state by treating with hexamethylene tetramine but was thermoset by heating in the presence of 2,4,6-trimethylolphenol in accordance with the procedure described in Example VIII.

It also will be apparent to those skilled in the art that 2,4,6-trimethylolphenol and its alkali metal and alkaline earth metal salts may be used to bring about cross-linking at uniformly spaced, controlled intervals in phenol-aldehyde polymer chains to form so-called "block polymers." This is achieved, for example, by adding the thermosetting additive to phenol-aldehyde resins having methylene bridged phenolic nuclei, arranged in a known chemical structure, for example, the trinuclear condensation product of para-cresol and formaldehyde. This product has three para-methyl substituted phenol units joined by methylene bridges at the positions ortho to the phenolic hydroxyl group. By reaction of 2,4,6-trimethylolphenol or its alkaline earth or alkali metal salts with this molecule a three dimensional polymer is created having a branched link at every fourth phenyl ring in the chain. Other methylene bridged phenolic structures behave similarly, the position of the branch in the chain being determined by the length of the molecule being cross-linked by the trimethylolphenol unit.

The following example illustrates this feature of the invention:

*Example X*

The thermoplastic trinuclear compound of p-cresol was prepared by reacting p-cresol, formaldehyde, and acid according to the method of Koebner, Z. Angew. Chem 46, 251 (1933). The product was a crystalline powder having a melting point of 214° C. One gram samples of this material were dissolved in approximately 10 ml. of acetone and employed in each of the following tests.

To one sample was added 10% by weight, based on the weight of the compound, of hexamethylene tetramine. On heating a clear resin formed which did not thermoset but remained liquid above 220° C.

To a second sample was added 10% by weight, based on the weight of the compound, of a thermosetting additive prepared by neutralizing the lithium salt of 2,4,6-trimethylolphenol with an acetone solution of sulfuric acid. The solution formed a waxy gel in five minutes when heated to 150° C. The product was quite friable on cooling and decomposed without melting at temperatures above 200° C.

To a third sample there was added 20% by weight, based on the weight of the compound, of lithium trimethylolphenate. On heating the product thermosets in 6 to 7 minutes at 150° C. The product was quite friable and darkened and decomposed without melting at temperatures above 200° C.

The friable thermoset bodies of samples two and three above represent block polymers of methylene bridged phenolic nuclei having branch links at each fourth phenolic ring along the chain.

*Example XI*

A molded article was prepared by admixing and blending on differential rolls a mixture consisting of 35 parts of the phenol-formaldehyde resin prepared as described in Example II, 9.5 parts of the lithium salt of trimethylolphenol, and 27 parts of aluminum silicate and 27 parts of cotton floc as fillers. The materials were blended on the rolls for 3 to 4 minutes at 100° C. and then removed, cooled, and ground to a powder in a hammer mill. The powder was then placed in a press and pressed at a temperature of 150° C. under a pressure of 3000 p. s. i. for about 8 minutes. The press was then opened and the resulting molded article obtained was withdrawn. It was found to be uniform in appearance and to be a hard, thermoset body.

It is a still further important feature of this invention that urea-aldehyde and melamine-aldehyde resins also may be converted to thermostat resins by treatment with 2,4,6-trimethylolphenol or its alkaline earth or alkali metal salts. Like phenol-aldehyde resins, the urea- and melamine-aldehyde resins may be prepared employing a deficiency of aldehyde to urea or melamine. When the resulting thermoplastic resin is heated to a temperature within the range of 90° C. to 180° C. in the presence of the thermosetting additive of this invention it is converted to a thermoset resin.

While the present invention has been described with reference to particular examples and embodiments thereof, it will be understood, of course, that substitutions, modifications and changes may be made therein without departing from its true scope.

I claim as my invention:

A molding composition comprising an intimate admixture of (A) a thermoplastic resin consisting of an aldehyde-difunctional phenol condensation product of an aldehyde selected from the group consisting of formaldehyde, para-formaldehyde, furfuraldehyde, and acetaldehyde and a difunctional phenol selected from the group consisting of an ortho-monoalkyl substituted phenol and a para-monoalkyl substituted phenol in a molar ratio of less than 1:1, and (B) a thermosetting additive selected from the group consisting of 2,4,6-trimethylolphenol and alkali metal and alkaline earth metal salts thereof, said additive (B) being present in an amount within the range of 3% to 20% by weight based upon the total weight of the composition whereby to establish the ratio of the sum of the aldehyde reacted with the difunctional phenol in the preparation of (A) and the methylol groups of (B) to above the molar ratio of 1:1, said molding composition being convertible to a thermoset body on heating to a temperature within the range of 90° C. to 180° C.

References Cited in the file of this patent

UNITED STATES PATENTS 2,387,256   Groten _____ Oct. 23, 1945

OTHER REFERENCES

Carswell: "Phenoplasts," High Polymers, vol. VII, Interscience Publishers, Inc., N. Y., pages 19, 31, 33 and 35.

Freeman: Am. Chem. Soc., vol. 74, pages 6257–6260, Dec. 20, 1952.